United States Patent Office 2,857,397
Patented Oct. 21, 1958

---

2,857,397

2,5-BIS(PHTHALIMIDOMETHYL)-TETRAHYDROFURAN

Arthur C. Cope, Belmont, Mass.

No Drawing. Original application February 27, 1956, Serial No. 567,725. Divided and this application March 20, 1957, Serial No. 647,212

1 Claim. (Cl. 260—326)

This invention relates to the compound 2,5-bis(phthalimidomethyl)-tetrahydrofuran which has the following structure:

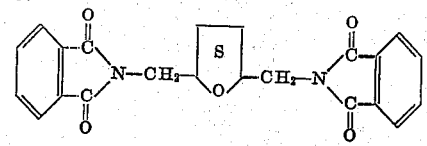

The starting compound for making this product in accordance with this invention is cis-2,5-bis-(hydroxymethyl)-tetrahydrofuran ditosylate. This starting compound is obtainable by the procedure outlined by F. H. Newth and L. F. Wiggins in the Journal of the Chemical Society, 155 (1948). The cis-2,5-bis-(hydroxymethyl)-tetrahydrofuran ditosylate is converted to 2,5-bis-(phthalimidomethyl)-tetrahydrofuran by reaction with potassium phthalimide in the presence of dimethylformamide. This mixture is heated and after cooling the solution is poured into a chloroform-water mixture. The chloroform layer is recovered and is washed with sodium hydroxide and water and then dried over sodium sulphate and concentrated to a small volume. The solid that separates is 2,5 - bis - (phthalimidomethyl)-tetrahydrofuran which may then be recrystallized from ethanol.

EXAMPLE I

*2,5-bis-(phthalimidomethyl)-tetrahydrofuran*

A mixture of 11.0 g. of cis-2,5-(hydroxymethyl)-tetrahydrofuran ditosylate, 10.0 g. of potassium phthalimide and 50 ml. of dimethylformamide was heated at 155–165° for 16 hours. After cooling, the solution was poured into a mixture of 100 ml. of chloroform and 150 ml. of water. The chloroform layer was separated, washed with 2 N sodium hydroxide and water, dried over sodium sulphate and concentrated to a small volume. The solid that separated amounted to 4.5 g. (45%) of 2,5-bis-(phthalimidomethyl)-tetrahydrofuran.

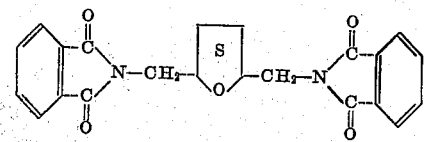

which after recrystallization from ethanol melted at 228–229.5.

The 2,5-bis-(phthalimidomethyl)-tetrahydrofuran is useful as an intermediate to produce the diamine 2,5-bis-(aminomethyl)-tetrahydrofuran.

EXAMPLE II

*2,5-bis-(aminomethyl)-tetrahydrofuran*

A solution of 15.3 g. of 2,5-bis-(phthalimidomethyl)-tetrahydrofuran and 5.0 ml. of 85% hydrazine hydrate in 100 ml. of methanol was heated under reflux for 2 hours. The mixture was cooled, 50 ml. of water was added, and the methanol was distilled under reduced pressure. Concentrated hydrochloric acid (50 ml.) was added to the residue and the mixture was heated under reflux for 1 hour. After cooling, the solid precipitate was separated and the filtrate was concentrated under reduced pressure. The residual solution was made basic with 2 N sodium hydroxide and extracted continuously with ether for 2 days. The extract was dried over potassium hydroxide, concentrated, and the residue was fractionated through a semi-micro column, yielding 1.76 g. (35%) of 2,5-bis-(aminomethyl)-tetrahydrofuran.

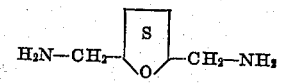

B. P. 56° (0.26 mm.), $N^{25}D$, 1.4832. Analysis indicated that this hygroscopic diamine contained a small amount of water.

For analysis of the diamine, it was converted to the dipicrate by the addition of the diamine to a saturated solution of picric acid in absolute ethanol. The precipitate was separated and recrystallized from ethanol to a constant melting point of 211.5–212.5°.

The 2,5-bis-(aminomethyl)-tetrahydrofuran is useful as a corrosion inhibitor. For example, it may be added to boilers or radiators to reduce the usual corrosive action which occurs therein. This diamine is also useful as an absorbent for acidic gases, such as $CO_2$, $SO_2$ and $H_2S$. Passage of a gas mixture containing such an acidic gas, through a column or bed of diamine will result in selective removal of the acidic gas.

This application is a division of my copending application Serial No. 567,725, filed on February 27, 1956, and entitled "2,5-bis(aminomethyl)-tetrahydrofuran."

I claim:

The compound, 2,5-bis-(phthalimidomethyl)-tetrahydrofuran, having the structure:

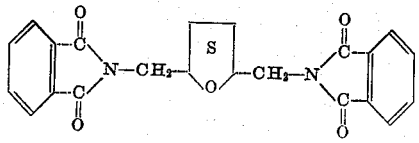

References Cited in the file of this patent

UNITED STATES PATENTS

| | | |
|---|---|---|
| 2,452,315 | Morgan et al. | Oct. 26, 1948 |
| 2,535,987 | Randall et al. | Dec. 26, 1950 |
| 2,593,840 | Buc | Apr. 22, 1952 |
| 2,835,714 | Nixon et al. | May 20, 1958 |

OTHER REFERENCES

Jour. Chem. Soc. (London), 1948, pages 155–158.
Helv. Chimica Acta, vol. 37, #6, pp. 1699–1706 (1954).